US012613932B2

(12) United States Patent
Saini et al.

(10) Patent No.: US 12,613,932 B2
(45) Date of Patent: Apr. 28, 2026

(54) SEARCH RANKER WITH CROSS ATTENTION ENCODER TO JOINTLY COMPUTE RELEVANCE SCORES OF KEYWORDS TO A QUERY

(71) Applicant: Microsoft Technology Licensing, LLC, Redmond, WA (US)

(72) Inventors: Deepak Saini, Bellevue, WA (US); Jian Jiao, Bellevue, WA (US); Bhawna Paliwal, Palwal (IN); Mudit Dhawan, New Delhi (IN); Manik Varma, New Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 18/419,378

(22) Filed: Jan. 22, 2024

(65) Prior Publication Data

US 2025/0238474 A1      Jul. 24, 2025

(51) Int. Cl.
| | |
|---|---|
| *G06F 16/95* | (2019.01) |
| *G06F 16/951* | (2019.01) |
| *G06F 16/9532* | (2019.01) |
| *G06F 16/954* | (2019.01) |
| *G06F 40/284* | (2020.01) |

(52) U.S. Cl.
CPC .......... *G06F 16/954* (2019.01); *G06F 16/951* (2019.01); *G06F 16/9532* (2019.01); *G06F 40/284* (2020.01)

(58) Field of Classification Search
CPC ................................................... G06F 16/954
See application file for complete search history.

(56) References Cited

U.S. PATENT DOCUMENTS

| | | | | |
|---|---|---|---|---|
| 2013/0290320 | A1* | 10/2013 | Zhu | ......................... G06F 16/95 |
| | | | | 707/723 |
| 2017/0046345 | A1* | 2/2017 | Takahashi | ......... G06F 16/24578 |
| 2017/0212957 | A1* | 7/2017 | Voleti | .................. G06F 16/9535 |
| 2018/0060340 | A1* | 3/2018 | Hazra | ............... G06F 16/90324 |

(Continued)

OTHER PUBLICATIONS

Nogueira, et al., "Multi-stage document ranking with BERT", arXiv:1910.14424v1, Oct. 31, 2019, 13 pages.

(Continued)

*Primary Examiner* — Mohammad S Rostami
(74) *Attorney, Agent, or Firm* — Alleman Hall LLP

(57) ABSTRACT

A computing system is provided including processing circuitry configured to implement a ranker module configured to jointly compute relevance scores of a set of candidate keywords to a query, and to generate a ranked list of candidate keywords based on the relevance scores. The ranker module includes a cross attention encoder configured to jointly compute the relevance scores by obtaining contextual embeddings for query tokens in the query and union of keyword tokens in the set of keywords, selectively pooling the contextual embeddings for the query tokens and the union of keyword tokens, inputting the selectively pooled contextual embeddings into a classifier that has been trained to predict a relevance score of the plurality of keywords to the query based on the contextual embeddings to output a relevance score for each query-keyword pair for the keywords in the set of candidate keywords, and outputting the ranked list of candidate keywords.

13 Claims, 12 Drawing Sheets

(56) References Cited

U.S. PATENT DOCUMENTS

| | | | | |
|---|---|---|---|---|
| 2018/0246896 | A1* | 8/2018 | Bailey | G06F 16/367 |
| 2018/0365321 | A1* | 12/2018 | Ke | G06F 40/284 |
| 2020/0334307 | A1* | 10/2020 | Prasad | G06F 16/9532 |
| 2020/0349634 | A1* | 11/2020 | Ghamsari | G06Q 30/0643 |
| 2021/0303568 | A1* | 9/2021 | Chundi | G06F 16/24534 |
| 2021/0342528 | A1* | 11/2021 | Kapcar | G06F 40/186 |
| 2021/0375269 | A1* | 12/2021 | Yavuz | G10L 15/063 |
| 2022/0253447 | A1* | 8/2022 | Boytsov | G06F 16/319 |
| 2022/0284058 | A1* | 9/2022 | Hazra | G06F 16/90324 |
| 2022/0358172 | A1* | 11/2022 | Simhadri | G06F 40/237 |
| 2022/0383048 | A1* | 12/2022 | Fei | G06F 40/44 |
| 2023/0017667 | A1* | 1/2023 | Hao | G06F 16/9535 |
| 2023/0385546 | A1* | 11/2023 | Eby | G10L 15/183 |
| 2023/0394781 | A1* | 12/2023 | Hatamizadeh | G06V 10/7715 |
| 2024/0012840 | A1* | 1/2024 | Al-Qurishi | G06F 40/279 |
| 2024/0241902 | A1* | 7/2024 | Shalmashi | G06F 16/35 |
| 2025/0181611 | A1* | 6/2025 | Liu | G06F 16/3322 |

OTHER PUBLICATIONS

Chen, et al., "Make Every feature Binary: A 135B parameter sparse neural network for massively improved search relevance", Microsoft Research Blog, Aug. 4, 2021, 10 pages.

Choi, et al., "Improving Bi-encoder Document Ranking Models with Two Rankers and Multi-teacher Distillation", In Proceedings of the 44th International ACM SIGIR Conference on Research and Development in Information Retrieval, 2021, pp. 2192-2196.

Dai, et al., "Context-aware document term weighting for ad-hoc search", In Proceedings of The Web Conference 2020, pp. 1897-1907.

Dai, et al., "Deeper Text Understanding for IR with Contextual Neural Language Modeling", n Proceedings of the 42nd International ACM SIGIR Conference on Research and Development in Information Retrieval, 2019, pp. 985-988.

Devlin, et al., "BERT: Pre-training of Deep Bidirectional Transformers for Language Understanding", arXiv:1810.04805v1, Oct. 11, 2018, 14 pages.

Devlin, et al., "BERT: Pre-training of Deep Bidirectional Transformers for Language Understanding", In Proceedings of NAACL, 2019, pp. 4171-4186.

Fan, et al., "Pre-training methods in information retrieval", Foundations and Trends® in Information Retrieval, vol. 16, Issue No. 3, 2022, 150 pages.

Gao, et a., "Rethink training of BERT rerankers in multi-stage retrieval pipeline", Springer, 2021, pp. 280-286.

Gao, et al., "SimCSE: Simple Contrastive Learning of Sentence Embeddings", In Proceedings of the Conference on Empirical Methods in Natural Language Processing, 2021, pp. 6894-6910.

Guo, et al., "Semantic Models for the First-Stage Retrieval: A Comprehensive Review", ACM Transactions on Information Systems, Mar. 8, 2021, 41 pages.

Khattab, et al., "ColBERT: Effcient and Effective Passage Search via Contextualized Late Interaction over BERT", arXiv:2004. 12832v2, Jun. 4, 2020, 10 pages.

Liu, et al., "Cascade ranking for operational e-commerce search", In Proceedings of the 23rd ACM SIGKDD International Conference on Knowledge Discovery and Data Mining, 2017, pp. 1557-1565.

Lu, et al., " TwinBERT: Distilling Knowledge to Twin-Structured BERT Models for Effcient Retrieval", arXiv:2002.06275v1, Feb. 14, 2020, 8 pages.

Matveeva, et al., "High accuracy retrieval with multiple nested ranker", In Proceedings of the 29th annual international ACM SIGIR conference on Research and development in information retrieval, 2006, pp. 437-444.

Nogueira, et al., "Passage Re-ranking with BERT", arXiv:1901. 04085v5, Apr. 14, 2020, 5 pages.

Pradeep, et al., "Squeezing Water from a Stone: A Bag of Tricks for Further Improving Cross-Encoder Effectiveness for Reranking", Springer, 2022, pp. 655-670.

Qiao, et al., "Understanding the Behaviors of BERT in Ranking", arXiv:1904.07531v4, Apr. 26, 2019, 4 pages.

Sanh, et al., "DistilBERT, a distilled version of BERT: smaller, faster, cheaper and lighter", arXiv:1910.01108, 2019, 5 pages.

Trabelsi, et al., "Neural ranking models for document retrieval", Information Retrieval Journal, 2021, pp. 400-444.

Vaswani, et al., "Attention is all you Need," 31st Conference on Neural Information Processing Systems, 2017, 11 pages.

Xiong, et al., "Approximate nearest neighbor negative contrastive learning for dense text retrieval", ICLR, 2021, 16pages.

Yates, et al., "Pretrained Transformers for Text Ranking: BERT and Beyond", In Proceedings of NAACL, 2021, 4 pages.

Yilmaz, et al., "Cross-Domain Modeling of Sentence-Level Evidence for Document Retrieval", In Proceedings of the Conference on Empirical Methods in Natural Language Processing and the 9th International Joint Conference on Natural Language Processing, 2019, pp. 3490-3496.

Zhao, et al., "Dense text retrieval based on pretrained language models: A survey", arXiv:2211.14876v1, 2022, 41 pages.

Zhou, et al., "Towards robust ranker for text retrieval", arXiv:2206. 08063v1, Jun. 16, 2022, 16 pages.

* cited by examiner

TABLE 1

| Algorithm | MAP@100 | Overall Accuracy (%) |
|-----------|---------|----------------------|
| CE | 93.03 | 94.11 |
| CE' | 92.76 | 93.83 |

FIG. 4

TABLE 2

| Max-length in word-piece ($L$) | m | n |
|-------------------------------|--------|-------|
| 12 | 498.38 | 93.70 |
| 16 | 499.34 | 94.02 |
| 32 | 501.52 | 94.60 |

FIG. 5

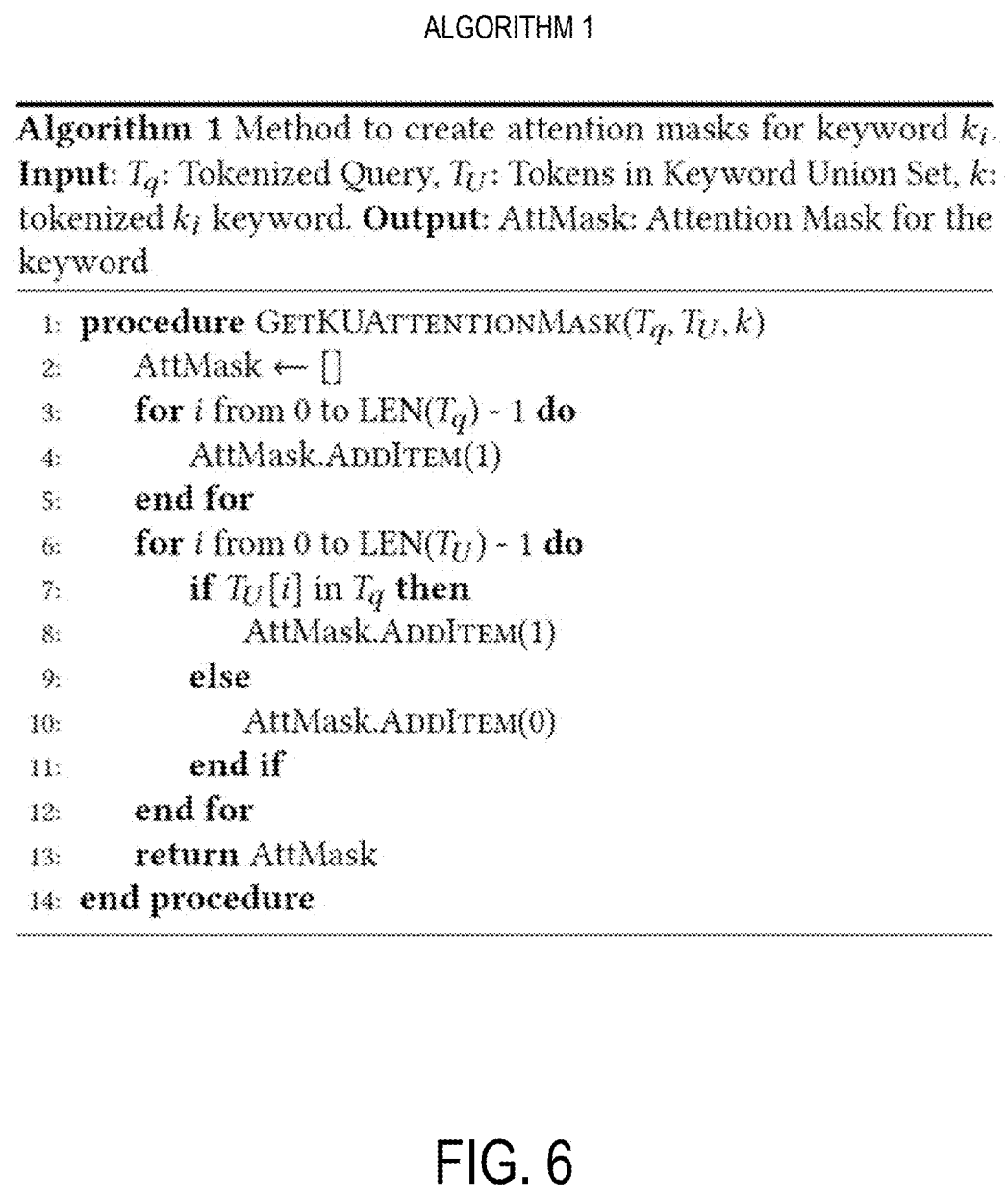

ALGORITHM 1

Algorithm 1 Method to create attention masks for keyword $k_j$.
Input: $T_q$: Tokenized Query, $T_U$: Tokens in Keyword Union Set, $k$: tokenized $k_j$ keyword. Output: AttMask: Attention Mask for the keyword 1:    procedure GETKUATTENTIONMASK($T_q$, $T_U$, $k$)
2:        AttMask ← []
3:        for $i$ from 0 to LEN($T_q$) - 1 do
4:           AttMask.ADDITEM(1)
5:        end for
6:        for $i$ from 0 to LEN($T_U$) - 1 do
7:           if $T_U[i]$ in $T_q$ then
8:              AttMask.ADDITEM(1)
9:           else
10:             AttMask.ADDITEM(0)
11:           end if
12:        end for
13:        return AttMask
14: end procedure

FIG. 6

Figure 7:
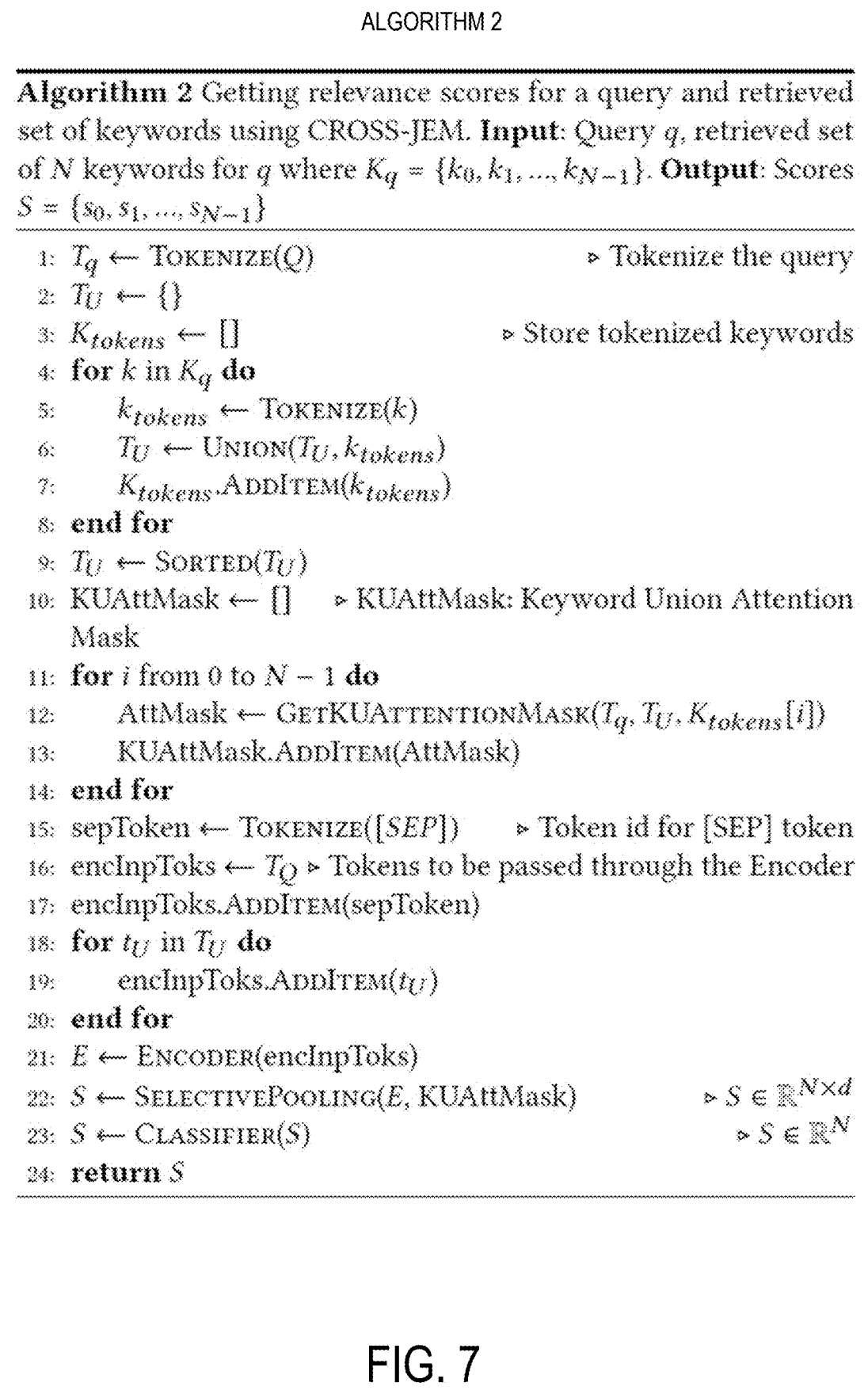

ALGORITHM 2

---

Algorithm 2 Getting relevance scores for a query and retrieved set of keywords using CROSS-JEM. Input: Query $q$, retrieved set of $N$ keywords for $q$ where $K_q = \{k_0, k_1, ..., k_{N-1}\}$. Output: Scores $S = \{s_0, s_1, ..., s_{N-1}\}$

---

1: $T_q \leftarrow$ TOKENIZE($Q$)                     ▷ Tokenize the query
2: $T_U \leftarrow \{\}$
3: $K_{tokens} \leftarrow []$                     ▷ Store tokenized keywords
4: for $k$ in $K_q$ do
5:     $k_{tokens} \leftarrow$ TOKENIZE($k$)
6:     $T_U \leftarrow$ UNION($T_U$, $k_{tokens}$)
7:     $K_{tokens}$.ADDITEM($k_{tokens}$)
8: end for
9: $T_U \leftarrow$ SORTED($T_U$)
10: KUAttMask $\leftarrow []$     ▷ KUAttMask: Keyword Union Attention Mask
11: for $i$ from 0 to $N - 1$ do
12:     AttMask $\leftarrow$ GETKUATTENTIONMASK($T_q$, $T_U$, $K_{tokens}[i]$)
13:     KUAttMask.ADDITEM(AttMask)
14: end for
15: sepToken $\leftarrow$ TOKENIZE($[SEP]$)     ▷ Token id for [SEP] token
16: encInpToks $\leftarrow T_Q$ ▷ Tokens to be passed through the Encoder
17: encInpToks.ADDITEM(sepToken)
18: for $t_U$ in $T_U$ do
19:     encInpToks.ADDITEM($t_U$)
20: end for
21: $E \leftarrow$ ENCODER(encInpToks)
22: $S \leftarrow$ SELECTIVEPOOLING($E$, KUAttMask)         ▷ $S \in \mathbb{R}^{N \times d}$
23: $S \leftarrow$ CLASSIFIER($S$)                     ▷ $S \in \mathbb{R}^N$
24: return $S$

TABLE 3

| Method | MAP@100 | P@50 | R@50 | AUC |
|---|---|---|---|---|
| CROSS-JEM | 97.48 | 45.76 | 99.07 | 99.41 |
| monoBERT | 98.42 | 45.87 | 99.21 | 99.61 |
| MEB | 84.38 | 42.94 | 94.65 | 91.77 |

FIG. 8

TABLE 4

| Method | Negative Accuracy | Overall Accuracy |
|---|---|---|
| CROSS-JEM | 99.45 | 95.27 |
| monoBERT | 99.72 | 95.40 |
| MEB | 84.59 | 84.40 |

FIG. 9

TABLE 5

| Method | MRR@10 |
|---|---|
| CROSS-JEM | 31.46 |
| CROSS-JEM++ | 33.40 |
| monoBERT | 32.47 |

FIG. 10

TABLE 6

| Method | Batch Size | CPU - 48 threads | GPU - V100 |
|--------|-----------|------------------|------------|
| CROSS-JEM | 10 | 744.7 | 8.3 |
| monoBERT | 1000 | 7555.3 | 280.0 |
| MEB | 1000 | 36.03 | ~ |

FIG. 11

TABLE 7

| Method | Batch Size | Throughput (Q-K pairs per second) |
|--------|-----------|-----------------------------------|
| CROSS-JEM | 200 | 17200 |
| monoBERT | 10000 | 3350 |
| MEB | 1000 | 27800 |

FIG. 12

TABLE 8

| $N$ | Negative Accuracy | Overall Accuracy | AUC |
|-----|-------------------|------------------|------|
| 10 | 99.18 | 94.94 | 99.24 |
| 20 | 99.37 | 94.96 | 99.34 |
| 50 | 99.52 | 94.82 | 99.40 |
| 80 | 99.56 | 94.71 | 99.51 |
| 100 | 99.45 | 95.27 | 99.42 |

FIG. 13

TABLE 9

| Encoder | Negative Accuracy | Overall Accuracy | AUC | Latency CPU |
|---------|-------------------|------------------|------|-------------|
| TinyBERT - 2 layer | 96.32 | 92.76 | 96.67 | 114.3 |
| DistilBERT - 6 layer | 99.45 | 95.27 | 99.61 | 744.7 |

FIG. 14

COMPUTING SYSTEM 600

PROCESSING CIRCUITRY 602

VOLATILE MEMORY 604

NON-VOLATILE STORAGE DEVICE 606

DISPLAY SUBSYSTEM 608

INPUT SUBSYSTEM 610

COMMUNICATION SUBSYSTEM 612

SEARCH RANKER WITH CROSS ATTENTION ENCODER TO JOINTLY COMPUTE RELEVANCE SCORES OF KEYWORDS TO A QUERY

BACKGROUND

Large-scale search and recommendation systems like sponsored search are usually bifurcated into a selection and relevance stage for better efficiency. Candidate selection retrieves hundreds to thousands of items per query from diverse sources. These candidates are then ranked for relevance. Scoring query-item pairs is crucial for such large scale applications to filter the candidates to a high-quality set. Transformer-based cross encoders are the de facto scoring approach but process query-item pairs separately, becoming infeasible for thousands of items per query. Due to such computational constraints, most conventional industrial systems use simpler sparse models for online ranking, achieving an increase in speed but suffering from a decrease in accuracy.

SUMMARY

A computing system is provided including processing circuitry and associated memory, the processing circuitry being configured to execute instructions stored in the associated memory to implement a ranker module configured to jointly compute relevance scores of a set of candidate keywords to a query, and to generate a ranked list of candidate keywords based on the jointly computed relevance scores. The ranker module includes a cross attention encoder configured to jointly compute the relevance scores by obtaining, via an encoder, contextual embeddings for query tokens in the query and a union of keyword tokens in the set of keywords, selectively pooling the contextual embeddings for the query tokens and the union of keyword tokens, inputting the selectively pooled contextual embeddings into a classifier that has been trained to predict a relevance score of the plurality of keywords to the query based on the selectively pooled contextual embeddings, to thereby cause the classifier to output a relevance score for each query-keyword pair for the keywords in the set of candidate keywords, wherein the ranked list of candidate keywords is ranked based on the outputted relevance scores, and outputting the ranked list of candidate keywords.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows Table 1, which includes results of an experiment to validate Statement 1. As shown, a cross encoder trained with sorted tokens for all keywords (CE') has similar performance as a standard cross encoder with ordered tokens (CE).

FIG. 5 shows Table 2, which includes sponsored search dataset statistics to validate Statement 2. Here, m is the mean tokens in a retrieved keyword set, while n is the mean tokens in union of tokens for a keyword set.

FIG. 6 shows Algorithm 1, which includes method to create attention masks for keyword $K_i$. Input: Tq: Tokenized Query, TU: Tokens in Keyword Union Set, k: tokenized $k_i$ keyword. Output: AttMask: Attention Mask for the keyword.

FIG. 7 shows Algorithm 2, which obtains relevance scores for a query and retrieved set of keywords using the CROSS-JEM embodiment. Input: Query q, retrieved set of N keywords for q where $Kq=\{k0, k1, \ldots, kN-1\}$. Output: Scores $S=\{s0, s1, \ldots, sN-1\}$.

FIG. 8 shows Table 3, which includes comparison of ranking metrics for the CROSS-JEM embodiment and baselines on the Sponsored Search Ads Dataset. P@50 and R@50 are the precision and recall for top 50 ranked predictions.

FIG. 9 shows Table 4, which includes comparison of Accuracy on the Sponsored Search Ads Dataset.

FIG. 10 shows Table 5, which includes comparison of MRR@10 for the CROSS-JEM embodiment and variants with monoBERT on MS MARCO Dataset.

FIG. 11 shows Table 6, which includes latency (ms) comparison of the CROSS-JEM embodiment and monoB-ERT. All latency numbers are for scoring 1000 keywords for a query.

FIG. 12 shows Table 7, which includes throughput comparison of the CROSS-JEM embodiment and monoBERT.

FIG. 13 shows Table 8, which includes variation in accuracy on varying the number of keywords scored per query by the CROSS-JEM embodiment.

FIG. 14 shows Table 9, which includes variation of the base transformer used in the CROSS-JEM embodiment.

DETAILED DESCRIPTION

1. Conventional Approaches

Figure 1:
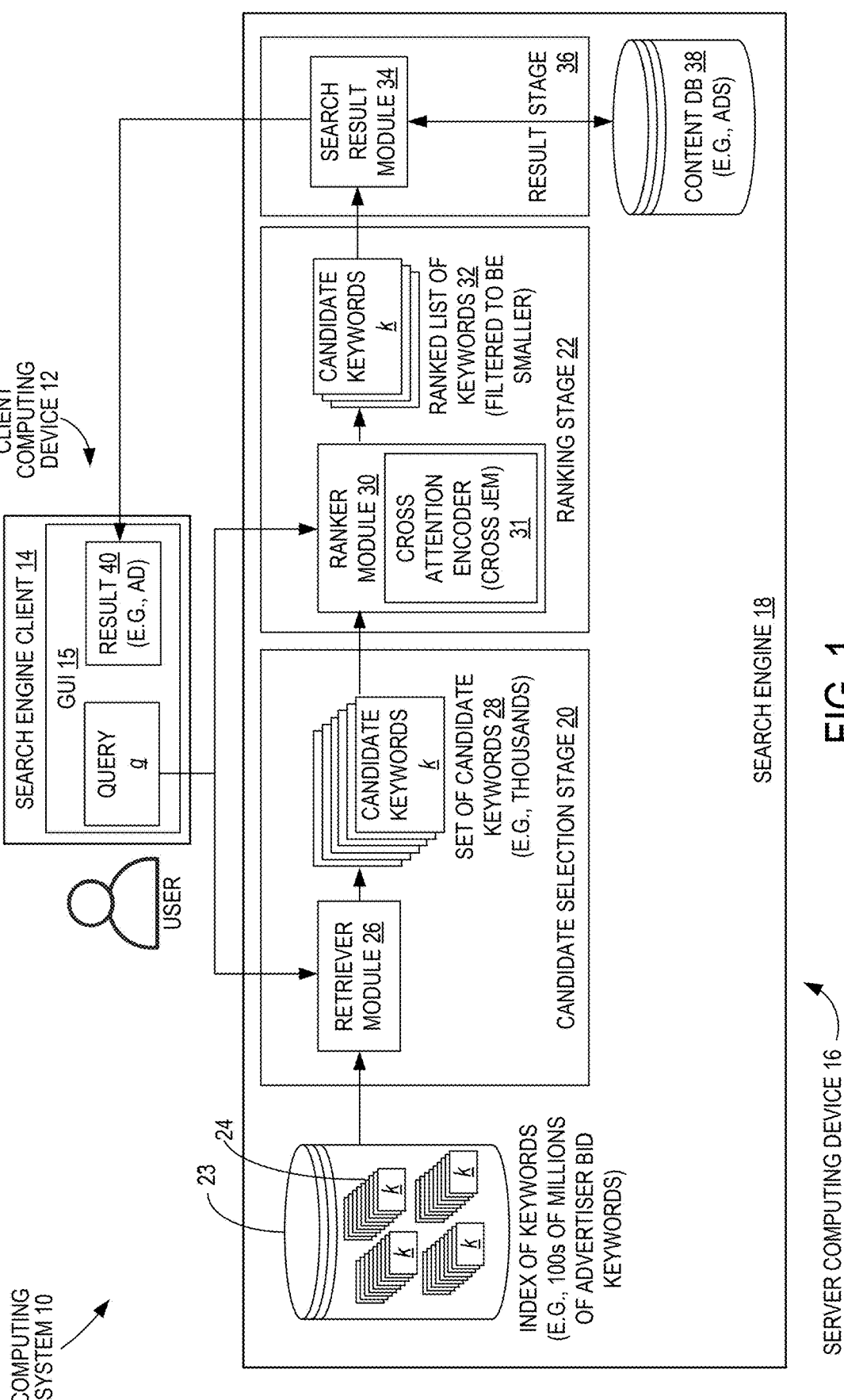
FIG. 1 shows a schematic view of an example typical large-scale sponsored search ads recommendation pipeline with two stages: candidate selection from a large number (e.g., 100s of millions) of keywords, and ranking of short-listed keywords.

The practice of ranking followed by retrieval is used in industrial retrieval applications, including sponsored search. Conventional cross encoder models are sometimes used for scoring query-keyword pairs. Such conventional cross encoder models take a keyword and query pair as input and output a relevance score. A few notable examples of conventional cross encoder models are monoBERT and Birch. By design, these conventional cross encoder models process each query-keyword pair separately, which can be computationally expensive for scenarios such as industrial scale online search, in which thousands of keywords must be scored per query in real-time.

In addition to cross encoder models, there are other conventional approaches that aim to improve the efficiency of scoring query-keyword pairs. One such approach is called MEB, which stands for "Make Every feature Binary," and introduces a large scale sparse neural network to understand nuanced relationships between queries and keywords. This can be done by defining facts like the occurrence of a token in both the query and the keyword. By considering each of such billions of facts as features and assigning weights to them, MEB can rank keywords based on how well they match the specific facts related to a query.

Late interaction models like TwinBERT and ColBERT are also used for online ranking due to their computational efficiency. However, these models, though faster, have shown to have worse accuracy compared to early interaction transformer-based models. It is to be noted that the increase in the computational efficiency of such models arises from the reduced interaction across the query and the keyword tokens which increases the chance of information loss.

As discussed above, conventional approaches to ranking relevance scores for keyword-query pairs use sparse models rather than transformer based cross encoders, trading accuracy for speed. Conventional transformer-based approaches, while offering higher accuracy, suffer from the technical challenge that they cannot score multiple items jointly per query in a manner that achieves sufficient speed for practical commercial deployments.

To address the issues above, the present disclosure proposes computing systems and methods, to score multiple items per query in one shot by exploiting redundancies in sequence modeling and token overlaps. By scoring items jointly, the present computing systems and methods offer the potential technical benefit of achieving over 10× speedups as compared to conventional cross encoders with minimal accuracy drop. As discussed in detail below, the present disclosure highlights the gap between real-world requirements of scoring thousands of items per query, and singular scoring limitations of current cross encoders, discloses computing systems and methods using a novel cross attention encoder for efficient joint scoring of multiple items per query, and explains the performance benefits of these computing systems and methods, which can achieve up to 10× faster scoring than cross encoders with under 1% accuracy drop on a large-scale sponsored search scoring task and also public benchmark. The present computing systems and methods are believed to open up new directions for the design of tailored early-attention-based ranking models that incorporate strict production constraints like item multiplicity and latency. The disclosed computing systems and methods efficiently handle the real-world challenge of scoring multiple items per query in real time.

2. Introduction

While the techniques described herein have application to a variety of search scenarios, for illustrative purposes the case of online sponsored search will be discussed in detail. Sponsored search involves matching user queries to relevant advertiser keywords to display pertinent sponsored content, such as ads. A schematic view of a computing system 10 including client computing device 12 executing a search engine client 14 of a user, and server computing device 16 executing a search engine 18 that can be used for sponsored search is shown in FIG. 1. Within a search engine 18, the process of predicting the most relevant set of keywords for a given user query can be divided into two processing stages: a candidate selection stage 20, and a ranking stage 22. In the search engine 18, one or more databases 23 storing indexes 24 of keywords k are maintained. The keywords k may be advertiser bid keywords k. In large scale deployments, the indexes 24 may contain, for example, hundreds of millions of such keywords k. In the candidate selection stage 20, a retriever module 26 executing a retriever algorithm retrieves from indexes 24 of keywords k, a set of keywords 28 including a sizable number of potential keywords k, generally hundreds to thousands, as matches for a given user query q. This set of keywords 28 can include candidate keywords from diverse sources including dense retrieval, sparse matching, generative models, graph expansion algorithms, etc. The retrieved keywords in set of keywords 28 then enter a ranking pipeline managed by a ranker module 30, which executes a ranking algorithm and scores and reorders the keywords 28 in the keyword list 28 by relevance to finally return a reduced-size ranked list 32 of top matching candidate keywords k for the query q. The ranked list 32 is a filtered list of keywords ranked by relevance score and is smaller since many keywords have been filtered out of the larger set of candidate keywords 28. As one example, the ranked list 32 may include from 3 to 10 entries. In another example the ranked list can include from 10-20 entries. The ranked list 32 of top matching candidate keywords k can be sent to a search result module 34, which in a results stage 36 makes decisions regarding which content will be served in response to the query q, in view of the relevance scores for the top matching keywords k in the ranked list 32 and other factors such as the price bid by each advertiser for the matching keywords k in the ranked list 32. The search result module 34 is thus configured to receive the ranked list 32 of candidate keywords k and generate a search result 40 including content associated with at least one of the candidate keywords k in the ranked list 32, and output the search result 40 to the search engine client 14 for display in the graphical user interface 15. To accomplish this, once the content determination has been made, content such as an ad from a content database 38 that is associated with an advertiser bid on one of the matching keywords k is retrieved and sent to a search engine client 14 of a user 36 to be displayed as a search result 40 in graphical user interface (GUI) 15 of the search engine client 14 of the search engine 18. The hardware configuration of the client computing device 12 and server computing device 16 is not shown in FIG. 1, but descriptions thereof can be found in FIG. 2B and FIG. 16, discussed below.

Scoring query-keyword pairs is a function of the ranking stage, which whittles down the large set of candidate keywords selected to a smaller high-quality set. Further, since the ranking stage receives candidates from diverse algorithms focused on low latency, the matches tend to contain many erroneous candidate keywords. Hence, the ranking stage serves the role of ensuring retrieval quality in large-scale search and recommendation systems. In some conventional systems, a cross encoder is employed during ranking to take a keyword and query as input and output a relevance score. However, conventional cross encoders process each query-keyword pair separately. This is prohibitively expensive as thousands of keywords must be scored per query in real-time. Due to such computational constraints, most conventional industrial systems end up using simpler sparse neural networks or late-interaction models for real-time online ranking, albeit at the cost of reduced accuracy compared to early interaction transformer-based cross encoders (henceforth referred to as standard cross encoder or cross encoder models).

The present disclosure addresses this technical challenge of scoring multiple keywords per query in a computationally efficient manner, which has heretofore prevented the widespread adoption of transformer based cross-encoders in keyword ranking in conventional industrial scale search engines. To address this technical challenge, a novel cross attention encoder 31 (or simply "cross encoder") is provided in ranking module 30 of computing system 10. This cross attention encoder 31, one embodiment of which is referred to as CROSS-JEM, is configured to efficiently score multiple keywords per query in one shot. Cross attention encoder 31 exploits redundancies in sequence modeling and token overlaps for faster keyword ranking. Given a query and a pool (or set) of keywords to be scored, cross attention encoder 31 takes a union of all keyword tokens, which by definition includes each keyword token used to represent the set of keywords to be scored, only once. It then applies self-attention over the query tokens concatenated with this keyword token union. That is, the query tokens are concatenated with the keyword tokens in the union of keyword tokens to form an input vector that input to the cross attention encoder, which computes self attention for each token in the input vector. A shared classification head next outputs a relevance score for each query-keyword pair based on the query tokens and the subset of keyword union tokens relevant to that pair. This classification head can be a simple fully connected multi-layer perceptron, or an attention-based neural network (e.g., Cross-JEM++), or a late interaction based max probability (MaxP) formulation. By modeling multiple keywords jointly in this manner, cross attention encoder 31 provides over 10× speedups compared to conventional cross encoders with minimal accuracy drop. Further, an alternative embodiment of the cross attention encoder 31, referred to as CROSS-JEM++, is disclosed, which allows attention between the query and relevant keyword tokens in the classification head. This enables the CROSS-JEM++ embodiment to outperform standard cross encoders by 1% in Mean Average Precision, as discussed below.

As briefly summarized above, contributions of the present disclosure include: (i) highlighting the gap between real-world requirements of scoring thousands of keywords per query, and current cross encoders' limited capability of singular scoring by working at a query-keyword pair level only, (ii) proposing a novel cross encoder that enables joint multiple keyword scoring per query, leveraging redundancies for efficiency, and (iii) demonstrating performance benefits of over 10× faster scoring than conventional cross encoders, with minimal accuracy drop on a large sponsored search dataset sampled from the logs of a leading search engine and a public benchmark.

The approach described herein opens new directions for designing tailored ranking models that account for production use case constraints like keyword multiplicity and latency requirements. The present approach exemplifies this by efficiently handling a core real-world challenge of scoring multiple keywords per query in real-time.

3. Observations

Before going into the algorithm details, the presuppositions in the following two statements about redundancies in scoring multiple advertiser keywords per query will be demonstrated to be true through evidence gathered from an advertising search engine dataset.

Statement 1: Sequence information is less useful for short keyword text compared to token similarity matches.

Statement 2: The candidate keywords for a given query have significant token overlap amongst themselves.

It is believed that in the present analysis these statements hold true because advertiser keywords are usually short pieces of text. Please note that these statements should also hold for other scenarios beyond advertising keywords when the items to be retrieved are annotated with short descriptions.

To validate these presuppositions, experiments were conducted on a dataset of query-keyword pairs mined from a commercial search engine.

3.1 Validating Statement 1

To validate Statement 1 the experiments start by mining relevant query-keyword pairs from the search engine logs. Then an 80-20 split test set was created. The training split has around 100 M querykeyword pairs while the test split has 10 M query-keyword pairs. To explain more clearly, first some notations are introduced in this section which will continue to be used in later sections as well. Let the set of training queries and keywords be defined as $Q_{tr}$ and Ktr respectively. Similarly, $Q_{te}$ and $K_{te}$ refer to the queries and keywords contained in the test set respectively. The subscripts are dropped when the meaning is clear from the context. The train dataset consists of q-k pairs where $q \in Q_{tr}$ and $k \in K_{tr}$.

For a given query q and keyword k, two cross encoder models are compared:

CE: Standard cross encoder scoring the sequence (q, k)

CE': Cross encoder scoring (q, k'), where k' is k with tokens sorted alphabetically.

If sequence ordering carries little signal, CE and CE' should have similar accuracy. Both CE and CE' are trained on the training set and evaluate on a held-out test set. Please note that when testing CE' on a q-k pair with $q \in Q_{te}$ and $k \in K_{te}$, the pair q-k' is instead input, where k' is k with tokens sorted alphabetically. As Table 1 in FIG. 4 shows, in the case when the sequence information from the keyword is discarded at both training and prediction time, both the mean average precision (MAP) and accuracy metrics are within 1% of the case when the sequence information in the keyword is retained.

3.2 Validating Statement 2

For this experiment, an ANCE dense retriever was trained on the training set. For a query $q \in Q_{te}$, let $\{k_0, k_1, \ldots, k_{N-1}\}$ denote the top N keywords retrieved by candidate generation, where N is 100 in the experiments. Let $$T_k^L$$

denote word-piece tokens in k with a max-length of L. The following statistics are computed:

$$\text{mean total tokens}(m) = \frac{1}{|Q_{te}|} \sum_{q \in Q_{te}} \left( \sum_{i=0}^{N-1} |T_{k_i}^L| \right) \quad (1)$$

$$\text{mean size of token union}(n) = \frac{1}{|Q_{te}|} \sum_{q \in Q_{te}} \left( \left| \bigcup_{i=0}^{N-1} T_{k_i}^L \right| \right) \quad (2)$$

If candidates have significant overlaps, m should far exceed n. Table 2 in FIG. 5 shows these numbers on a set of around 400 $Kq \in Q_{te}$ as the maximum length of the word-piece tokenizer, L is varied. The union size n is at least 5× smaller than m which is the sum of keyword token lengths on average, indicating high redundancy. This validates Statement 2.

The extensive experiments on real-world search data confirm the presuppositions of sequence redundancy and high token overlap for keyword scoring. Next, the CROSS-JEM embodiment of cross attention encoder 31 is presented in detail to exploit these observations for efficiency with minimal loss in accuracy.

4. The CROSS-JEM Embodiment of the Cross Attention Encoder

Notations:

Let q and $K_q$ be an input query and the corresponding retrieved set of N keywords for q where $Kg=\{k_0, k_1, \ldots, k_{N-1}\}$. The objective is to obtain a set of scores $S_q=\{s_0, s_1, \ldots, s_{N-1}\}$ for all keywords in Kg.

Figure 2A:
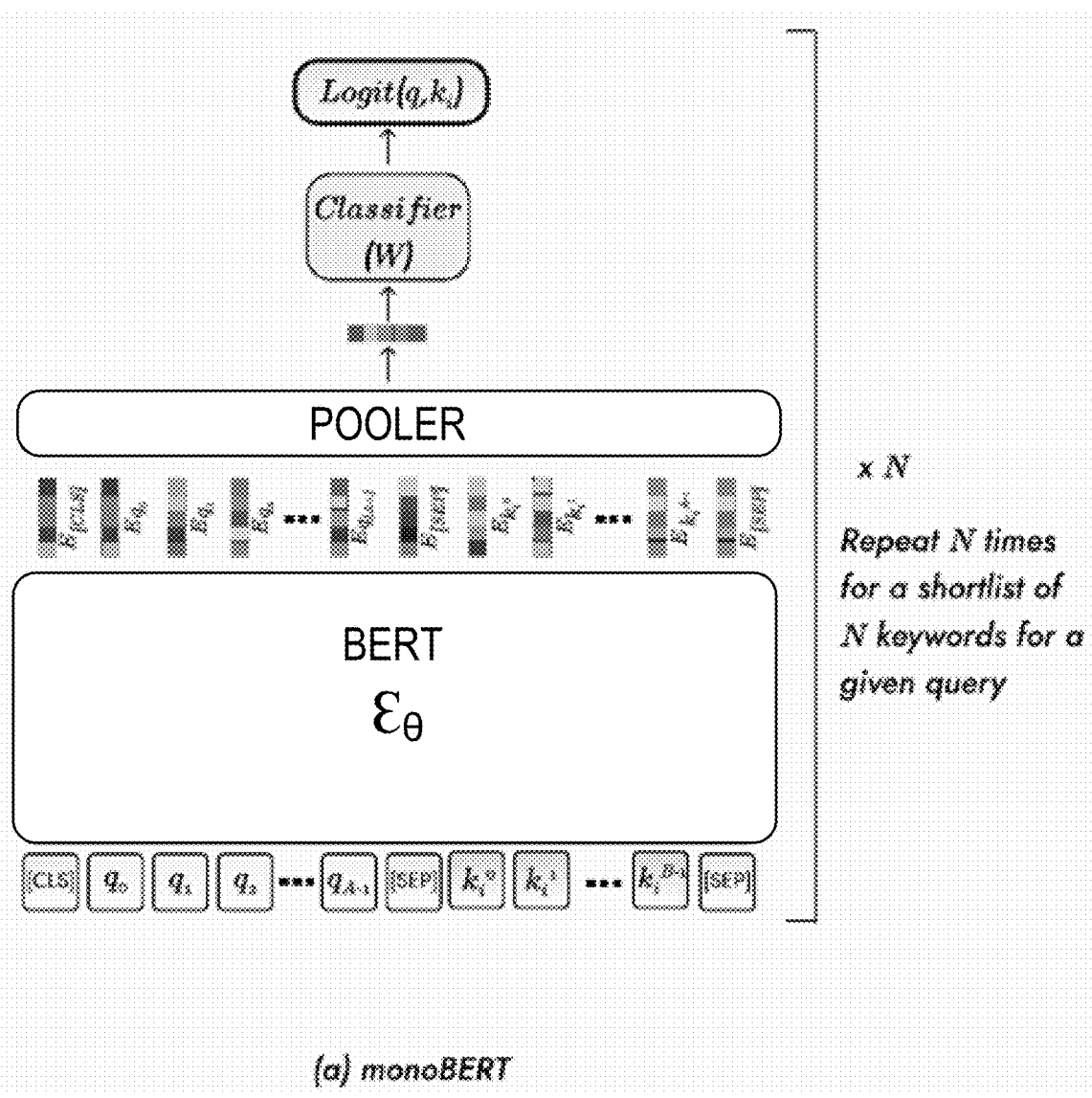
FIG. 2A illustrates computation of relevance scores for query q and retrieved set of N keywords $\{k_0, k_1, \ldots, k_{N-1}\}$ using monoBERT, which infers scores for each querykeyword pair with query and keyword tokens input one at a time through the encoder and classifier, repeating N times for N keywords.
Figure 2B:
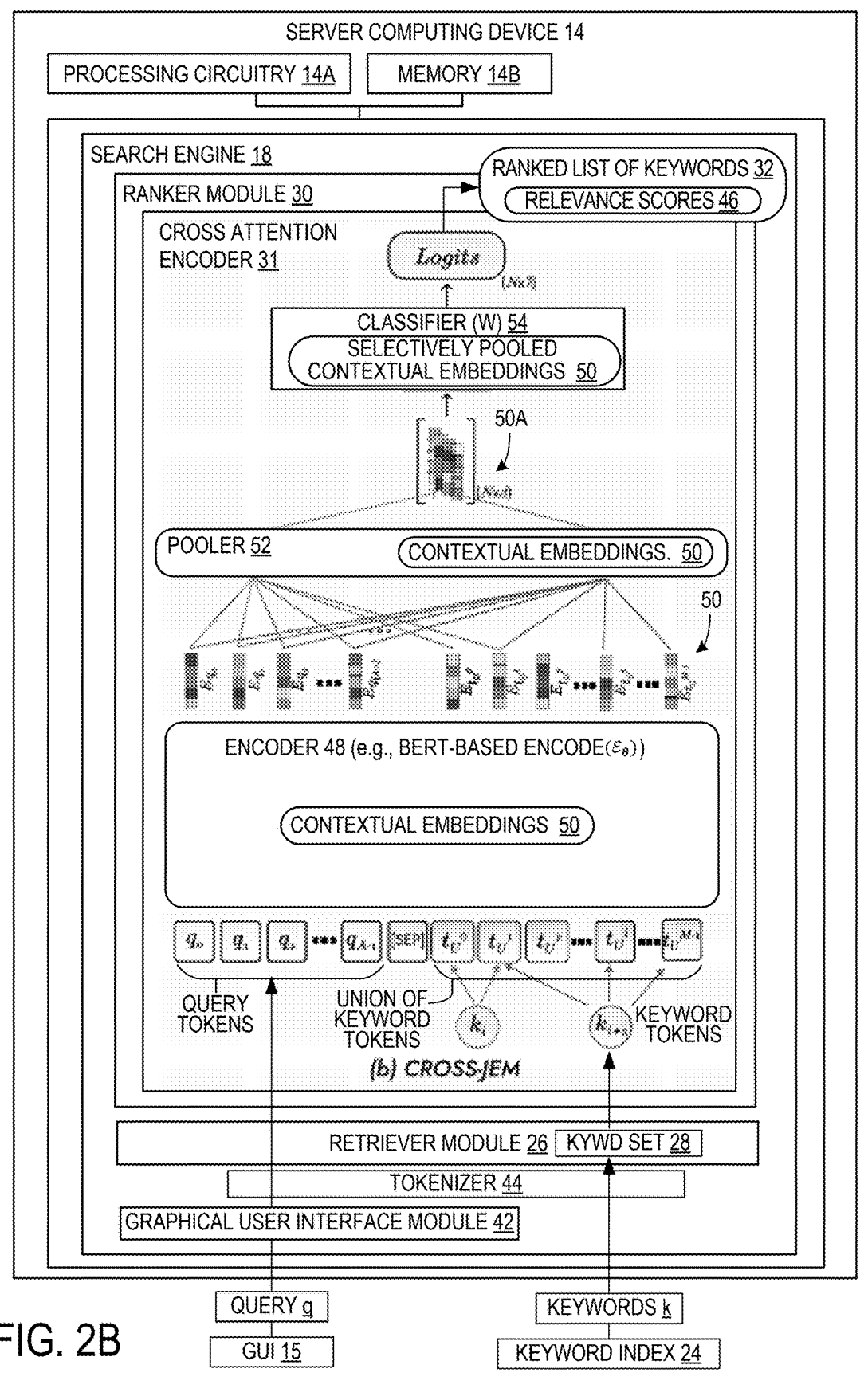
FIG. 2B shows a computing system including a search engine with a ranker module having a cross attention encoder that is configured to jointly compute relevance scores for a query and retrieved set of keywords in a single encoder and classifier pass through the cross attention encoder.
Figure 3:
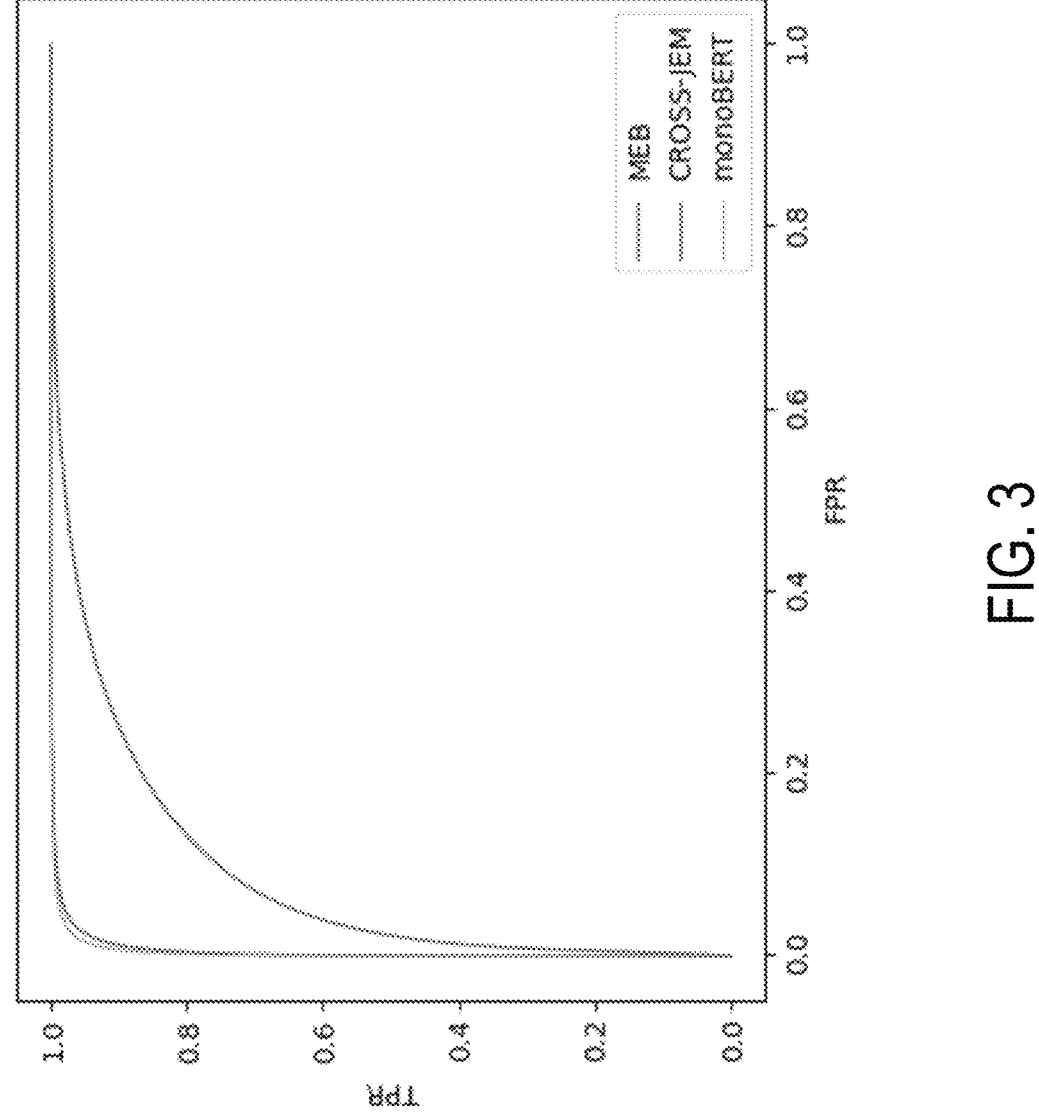
FIG. 3 illustrates ROC Curve for an embodiment of the present disclosure (CROSS-JEM), SCE, and MEB.

Architecture: The CROSS-JEM embodiment architecture is comprised of two components, an encoder such as a BERT-based Encoder $\varepsilon_\theta$, and a classification head W, which simply may be referred to as a classifier. Different from conventional cross encoders like monoBERT which model pairwise scoring implying scoring one q-k pair in one encoder and classifier pass, the CROSS-JEM embodiment models scores for all retrieved keywords using a single encoder and classifier pass. FIG. 2B illustrates the CROSS-JEM embodiment's components that are utilized to score a set of keywords $K_q$ for a given query q in a single pass of tokenized input to score output.

FIG. 2B shows a detailed schematic view of server computing device 14 of computing system 10. Server computing device 14 includes processing circuitry 14A and associated memory 14B. The processing circuitry 14A is configured to execute instructions stored in the associated memory 14B to implement search engine 18 and its constituent elements, including the retriever module 26, ranker module 30, and cross attention encoder 31. As touched upon above, the search engine 18 is configured to receive a search query q from a user via a graphical user interface 15 served to client computing device 14 over a computer network such as the Internet by a graphical user interface module 42 of the search engine 18. The search engine 18 is configured to process the search query q by tokenizing it into constituent tokens using a tokenizer 44. Similarly, keywords k from the keyword index can be tokenized by tokenizer 44. The retriever module 26 is configured to receive the tokenized search query q and generate the set 28 of candidate keywords based on the search query q, from a keyword set in the keyword index that is larger than the candidate keyword set 28.

Ranker module 30 is configured to compute relevance scores 46 for query q and retrieved set of N keywords $\{k_0, k_1, \ldots, k_{N-1}\}$ using cross attention encoder 31. More specifically, the ranker module 30 is configured to jointly compute relevance scores 46 of a set of candidate keywords to a query, and to generate a ranked list 32 of candidate keywords based on (and sometimes including) the jointly computed relevance scores 40 via the cross attention encoder 31. As described above, the ranker module 30 can be a component in search engine 18, and the query q can be a search query q received from a user via a graphical user interface 15 of the search engine 18. Alternatively, the ranker module 30 may be incorporated in other forms of search engines.

The cross attention encoder 31 of the ranker module 30 is configured to jointly compute the relevance scores by obtaining, via an encoder 48 (e.g., Bert-based encoder $\varepsilon_\theta$), contextual embeddings 50 for query tokens $q_i$ in the query q and a union of keyword tokens $k_i$ in the set of keywords k. To jointly compute the relevance scores 46, the cross attention encoder 31 has been trained based on a training data set including a plurality of training keyword-query pairs and associated ground truth teacher model relevance scores computed by a teacher model. The computation of the ground truth teacher model relevance scores by the teacher model is more computationally expensive than the computation of the relevance scores 46 by the cross attention encoder 31, and typically so expensive that they could not practically be performed in real-time in an industrially deployed search engine in response to user search queries. However, the teacher model relevance scores are deemed to be accurate, i.e., ground truth, during training. After encoding by encoder 48, a plurality of query embeddings $E_{qi}$ and a plurality of keyword token union embeddings $$E_{t_{u^i}}$$

are produced.

To jointly compute the relevance scores 46, the cross attention encoder 31 is further configured to selectively pool, via a pooler 52, the contextual embeddings 50 for the query tokens and the union of keyword tokens. Selectively pooling the contextual embeddings 50 may be accomplished using a maximum pooling operation or mean pooling operation, for example. Furthermore, selectively pooling the contextual embeddings 50 may be achieved using a keyword union attention mask that includes each distinct keyword token in the keyword token set only once (i.e., a union set of keyword tokens). Moreover, it will be appreciated that selectively pooling the contextual embeddings 50 produces a single embedding of d-dimensionality for each input pair of the query and each keyword token in the union of keyword tokens that can represent all candidate keywords. Collectively, these contextual embeddings for all keyword-query pairs in the keyword set 28 are pooled into an N×d array 50A that is passed as input into the classifier 54 in one pass, as described below. Further, in one configuration described below, mean pooling can be used to compute the selectively pooled contextual embedding 50 for each query-keyword pair, by taking the mean of the each query token embedding $E_{qi}$ in the query q and taking the mean of each keyword token embedding $$E_{t_{u^i}}$$

in the keyword k of the query-keyword pair.

The cross attention encoder 31 is further configured to input the N×d array of selectively pooled contextual embeddings 50 for all keyword-query pairs in the set of candidate keywords 28 in one pass into a classifier (W) 54 that has been trained to predict a relevance score of the plurality of keywords to the query based on the selectively pooled contextual embeddings 50, to thereby cause the classifier 30 to output a relevance score 46 for each query-keyword pair for the keywords in the set of candidate keywords 28. These relevance scores can be used to generate a ranked list 32 of candidate keywords, which is ranked based on the relevance scores 46. The selectively pooled contextual embeddings 50 are input in a single pass through the classifier 54 to output the relevance scores 46 for the query-keyword pairs for all candidate keywords in set 28. The ranker module 30 is further configured to output the ranked list 32 of candidate keywords to a search result module 34 (see FIG. 1). The search result module 34 is configured to generate a search result 40 including content associated with at least one of the candidate keywords in the ranked list 32, and output the search result 40 to the search engine client 14 for display in the graphical user interface 15.

The functions of the above the encoder 48, the pooler 52, and the classifier 54 of the cross attention encoder 31 of the ranker module 30 are further described in detail below.

4.1 Encoder

Encoder $\varepsilon_\theta$ takes as input a sequence of tokens T= $\{t_0, t_1, \ldots, t_{n-1}\}$ and outputs a sequence of d-dimensional contextual embeddings $\varepsilon_\theta(T)=E=\{E_0, E_1, \ldots, E_{n-1}\}$, which provide context-dependent representations of all input tokens. These contextual embeddings $E_i \in \mathbb{R}^d$ are used for different downstream tasks such as classification, generation, retrieval, etc. Popular methods using BERT-based encoders for ranking postulate that the order of input tokens to the model is important for performance and hence compute the score for each keyword pairwise (for each q-k). Assuming the set of tokens from query q as $T_q=\{q_0, q_1, \ldots, q_{A-1}\}$ and tokens from keyword $$k_i \text{ as } \{k_i^0, k_i^1, \ldots, k_i^{B-1}\},$$

the contextual embeddings for the pair (q, $k_i$) in a standard cross encoder Ee are obtained as:

$$\varepsilon_\theta([CLS], q_0, q_1, \ldots, q_{A-1}, [SEP], k_i^0, k_i^1, \ldots, k_i^{B-1}) = E_{[CLS]}, \quad (3)$$

$$E_{q_0}, E_{q_1}, \ldots, E_{q_{A-1}}, E_{[SEP]}, E_{k_i^0}, \ldots, E_{k_i^{B-1}}$$

The contextual embeddings are pooled to obtain a single d dimensional embedding for an input pair of query and keyword tokens through pooling methods such as sum, mean or taking the [CLS] token embeddings as the input pair (q, $k_i$) representation. Further, a d-dimensional classifier is trained to predict a relevance score $s_i$ using the pooled representation. For the conventional technique illustrated in FIG. 2A, this process which includes the computationally expensive forward pass of the encoder is repeated N times for computing the scores for N keywords in $K_q$.

Exploiting the short keyword texts, and redundancy of tokens from keywords in $K_q$, the cross attention encoder 31 of the present disclosure discounts token order in favor of improving efficiency. This is achieved by computing the contextual embeddings for all distinct tokens in the retrieved keyword set $K_q$ in one pass, as briefly described above. The cross attention encoder 31 computes the sequence of input tokens to encoder as the set of query tokens combined with union of tokens for all $k_i \in K_q$. Contextual embeddings for all queries as well as keyword union tokens can hence be obtained with a single pass through the encoder. The union of all tokens of the keywords in $K_q$ is denoted as $$T_U = \{t_U^0, t_U^1, \ldots, t_U^{m-1}\}$$

where m is the total number of tokens in the union set. The contextual embeddings of all input tokens in the cross attention encoder 31 are thereby computed as $$E = \varepsilon_\theta(q_0, q_1 \ldots, q_{A-1}, [SEP], t_U^0, t_U^1, \ldots, t_U^{m-1}) = E_{q_0}, \quad (4)$$

$$E_{q_1}, \ldots, E_{q_{A-1}}, E_{[SEP]}, E_{t_U^0}, \ldots, E_{t_U^{m-1}}$$

Since the number of tokens in keyword union is significantly smaller than sum of tokens of all keywords in Kg as described in Section 3, the proposed token union based inference enables highly efficient computation of contextual embeddings.

4.2 Selective Pooling and Classifier

Having obtained the contextual embeddings E for all query tokens ($T_Q$) and keyword union tokens ($T_U$), cross attention encoder 31 employs a selective pooling method to jointly model per keyword relevance score. The cross attention encoder 31 typically leverages inexpensive mean pooling to get a combined representation of a query-keyword pair, although other types of pooling may alternatively be used. In an alternative configuration of cross attention encoder 31, a more computationally expensive self-attention based combination of query and selected keyword tokens context embeddings in the classifier is also possible, as is described in Section 4.5. For each keyword $k_i$ in $K_q$, a pooled representation for pair (q, $k_i$) is computed as the mean of the contextual embeddings for all tokens in $T_Q$ and selected tokens in $T_U$ which are present in $T_{k_i}$, where $T_{k_i}$ denotes the set of tokens in $k_i$.

The set of selected tokens $S_{qki}$ is given as $$S_{qk_i} = T_q \cup \{T_{[SEP]}\} \cup \{T_{k_i} \cap T_U\} \quad (5)$$

where $T_{[SEP]}$ is the token for [SEP].

The selectively pooled representation $E_{qki} \in \mathbb{R}^d$ is hence obtained as follows:

$$E_{qk_i} = \frac{1}{|s_{qk_i}|} \sum_{t_j \in S_{qk_i}} E_{t_j} \quad (6)$$

Classifier: A d dimensional shared linear classifier $W \in \mathbb{R}^d$ is used to get the relevance score for all keywords in $K_q$.

$$S_q = W \cdot E_{qk}^T \quad (7)$$

The selectively pooled representations $E_{qki}$ obtained for all $k_i \in K_q$ are batched together ($E_{qk} \in \mathbb{R}^{N \times d}$) leading to computation of scores $S_q$ in single shot.

4.3 Training

Cross attention encoder 31 aims to learn its model parameters $\{\theta, W\}$ by optimizing binary cross entropy loss while regressing over a teacher model scores as targets for training q-k pairs. A teacher model is usually a large standard cross encoder based model which is highly accurate but computationally expensive. The objective is described as $$\min_{\theta, W} \mathcal{L}(\theta, W) = \tag{8}$$

$$-\sum_{i=1}^{|Q_{tr}|} \sum_{j=1}^{N} [y_{ij} \log(W \cdot \mathcal{E}_\theta(q_i, k_j)) + (1 - y_{ij}) \log(1 - W \cdot \mathcal{E}_\theta(q_i, k_j))]$$

where $Q_{tr}$ is the set of all training pairs $(q_i, k_j)$, $y_{ij}$ are their corresponding teacher model scores, and N is number of keywords per query. Refer Section 5 for details of the teacher models used during experiments.

Cross attention encoder 31 is trained in an end-to-end fashion with parameters $\theta$, W optimized jointly. Each training point consists of a query and its corresponding set of N retrieved keywords. In each training iteration, the encoder processes all the tokens in the query and the union of tokens in the keyword set to output contextual embeddings. Selective pooling is applied to the resulting contextual embeddings from the encoder. The pooled representations are used in a linear classifier to generate pairwise logits for all keywords related to the query, as outlined in Algorithm 2. The training loss, described in Equation 8, is then calculated pairwise using these logits and target scores.

It is important to note that the objective function for cross attention encoder 31, as defined in Equation 8, can be optimized with binary targets, typically obtained from ground truth clicks on search results by users in the GUI 15 of search engine client 14, for example. A click can be taken to indicate that the search result is relevant to the search query, particularly if the click starts a click trail of a threshold length. Additionally, the cross attention encoder 31 can readily incorporate other effective loss functions for ranking, such as Localized Contrastive Estimation (LCE), which involves a single positive and multiple negatives followed by a multi-class classification loss to train a more robust ranker.

4.4 Inference

As described in relation to FIG. 2B, cross attention encoder 31 predicts the scores for a set of shortlist keywords jointly for a given query, which is closely aligned with training steps described in Algorithm 2.

Time Complexity: The present disclosure analyzes the time complexity of cross attention encoder 31 in terms of average number of query tokens, $L_q$, average number of keyword tokens $L_k$, number of transformer layers T, number of keywords per query N, and keyword union compression factor C. Compression factor C defines the number of tokens in keyword union as $(L_K \times N)/C$. For standard cross encoder, time complexity of obtaining scores for N keywords corresponding to a given query is:

$$(L_q + L_k)^2 TN \tag{9}$$

For cross attention encoder 31, corresponding time complexity where the present disclosure scores N keywords jointly is:

$$(L_q + L_k N/C)^2 L \tag{10}$$

Above time complexity expressions can be simplified by putting in the values as applicable in sponsored search experiments and making a simplifying assumption of $L_q \approx L_k$. Hence, N=100, C$\approx$14. C is calculated using the average tokens in a keyword i.e. 32 and maximum keyword union length used in the experiments of 220 implying C$\approx$(32*100)/220.

Standard cross encoder time complexity can now be re-written as:

$$(L_q + L_k)^2 TN = 400 L_q^2 L \tag{11}$$

The time complexity of cross attention encoder 31 can be approximated as:

$$(L_q + L_k N/C)^2 L \approx 66.3 L_q^2 L \tag{12}$$

The actual time complexity can vary depending on various factors such as the specific implementation of the model, the hardware employed, and optimizations applied such as quantization. The latency numbers for both of these models are added in section 5.

4.5 CROSS-JEM++

The CROSS-JEM embodiment of cross attention encoder 31 obtains contextual embeddings using the encoder E, followed by computationally inexpensive mean over query token embeddings and selected keyword token embeddings. An alternative configuration, CROSSJEM++, improves over the CROSS-JEM embodiment by building selective interaction across query and keyword tokens using self-attention. The pooled representation of a pair (q, kt) is obtained using two steps in the CROSSJEM++ embodiment: Firstly, self-attention is applied over contextual $$\left\{ E_{q_0}, E_{q_1}, \dots, E_{t_{k_i^0}}, E_{t_{k_i^1}}, \dots, E_{t_{k_i^{P}-1}} \right\}$$

where $E_{q_j}$ are contextual embeddings for query tokens and $$E_{t_i^j}$$

are contextual embeddings for $k_i$ tokens. Finally, the CROSS-JEM++ embodiment applies mean pooling over the new set of contextual embeddings similar to the CROSS-JEM embodiment. The present disclosure experiments with the CROSS-JEM++ embodiment on a public benchmark where it leads to an increase in accuracy at increased computational cost (described in Section 5).

5. EXPERIMENTS

This section empirically evaluates the proposed CROSS-JEM embodiment on a real world dataset mined from the logs of a leading search engine. The goal is to answer the following three questions (Qs).

Q1: How much latency and throughput gain does the CROSS-JEM embodiment provide compared to standard cross encoders?

Q2: What is the accuracy loss, if any, of the CROSS-JEM embodiment?

Q3: What can be learned from ablation on different design choices made in the CROSSJEM embodiment?

5.1 Experimental Setup

Datasets: The CROSS-JEM embodiment of the cross attention encoder 31 was designed for efficient ranking and filtering of irrelevant keywords in the advertiser keyword matching application. Therefore, a training dataset was created using a BERTLarge model trained on manually labeled and good-click data as the teacher model. A query-keyword pair in the good click data is obtained when the user clicked on the ad corresponding to an advertiser keyword in response to their query and did not close the ad quickly indicating they found it relevant. The BERT-Large teacher model was used to score 100 predicted keywords each for 18.6 M queries on the search engine during a time period. This resulted in around 1.8B query-keyword pairs with scores in 0 to 1 range as training data for the CROSS-JEM embodiment and baselines. The CROSS-JEM embodiment is further compared on the benchmark MS MARCO document re-ranking dataset which contains queries and their clicked web pages consisting of webpage title, URL, and passage. A "short-text" version of the dataset was created by considering only the titles of the webpages to make the statistics of the dataset better aligned with the advertiser keyword prediction application which is the target application of the CROSS-JEM embodiment. Experiments with HDCT retriever based training dataset consisting of 0.37 M training queries and top 10 predictions from HDCT along with their ground truth click labels were conducted. The present disclosure uses the dev set to report metrics as this set has ground truth labels available for evaluation.

3.7 M training pairs available in MS MARCO HDCT dataset as described above were used for training the CROSS-JEM embodiment and baselines using DistilBERT. The target scores for all training pairs are obtained from a monoBERT model trained on binary ground truth click data with BERT-Base as the base encoder.

Evaluation settings and metrics: A ranking model serves two purposes in a recommendation system: i) Weeding out bad retrievals made by the selection algorithms; ii) Ranking the prediction pool from different selection algorithms to select top-k. To validate the efficacy of CROSS-JEM for both of these tasks, the following evaluation metrics are considered.

Mean Average Precision (MAP): This is a ranking metric defined as the mean of Average Precision (AP) over the positive and negative detected classes. AP summarizes a precision-recall curve as the weighted mean of precisions achieved at each threshold, with the increase in recall from the previous threshold used as the weight. The mathematical formula for MAP@N is given by:

$$\frac{1}{|Q|}\sum_{u=1}^{|U|}\left(\frac{1}{m}\sum_{k=1}^{N}P_u(k)\cdot rel_u(k)\right) \quad (13)$$

where $|Q|$ is the total number of queries, $P_u(k)$ is the precision at cut-off k in the list, $rel_u(k)$ is an indicator function equaling 1 if the item at rank k is a relevant document, otherwise zero.

Positive Accuracy: This refers to the proportion of positive instances in the test set that are correctly identified as positive.

Negative Accuracy: This refers to the proportion of negative instances in the test set that are correctly identified as negative.

Overall Accuracy: This refers to the proportion of instances in the test set that are correctly predicted by the algorithm.

Area Under the ROC Curve (AUC-ROC): The ROC curve is a plot of True Positive Rate (TPR) or sensitivity against False Positive Rate (FPR) at different thresholds.

Prior research in the field of ranking has often utilized MRR@N as a comparative metric. However, MAP serves as a more comprehensive version of MRR, which is specifically designed for scenarios where the test set contains only one positive keyword per test query. In such instances, MAP essentially becomes equivalent to MRR. Moreover, MAP and AUC-ROC metrics primarily evaluate the quality of the ranking generated by the ranking algorithm. In order to further assess how effectively the ranking algorithm can eliminate incorrect predictions while maintaining a minimum loss of correct ones, the present disclosure evaluates both negative accuracy and overall accuracy, given that the score filtration threshold for the algorithm is selected to retain an average of 80% of correct keywords for a query.

Baselines: The present disclosure compares CROSS-JEM with two classes of methods:

Standard Cross encoders like monoBERT. As discussed in Conventional Approaches Works, cross encoders that apply self-attention between query and keyword have become the de facto choice for scoring. They provide state-of-the-art accuracy but process query-keyword pairs independently.

Sparse Models like MEB. Conventional Approaches (Section 2) described that for low-latency retrieval, sparse networks are sometimes used despite accuracy drops. A comparison is made to a production MEB variant to quantify possible CROSS-JEM gains.

The goal is to evaluate if CROSS-JEM can retain cross encoder accuracy while being efficient like late-interaction and sparse models. Comparisons to production systems like MEB is aimed at ascertaining real-world benefits.

Hyper-parameters: CROSS-JEM's tunable hyper-parameters include maximum keyword union length, $L_u$ and number of keywords per query, N. These hyper-parameter values are dictated by the application requirements and efficiency constraints. N=100 and $L_u$=220 were used for sponsored search advertiser keyword dataset and N=10 and $L_u$=360 for MS MARCO dataset.

5.2 RQ1: Latency and Throughput gains

The present disclosure quantifies the inference latency and throughput gains obtained by CROSS-JEM compared to scoring keywords independently using standard cross encoders on both CPU (Intel Xeon CPU @2.70 GHz) and GPU (V100).

Latency Comparison: Latency refers to the time taken to score a given set of query-keyword pairs. From Table 6 in FIG. 11, it can be observed that CROSS-JEM takes only around 8 ms to score 1000 keywords for a query on a V100 GPU. In contrast, the standard cross encoder monoBERT takes around 280 ms for the same task—over 30× higher latency. Further, even with 48CPU cores, monoBERT requires 7.5 seconds compared to CROSS-JEM's 744 ms. The latency difference is more pronounced for higher percentile latencies. For instance, monoBERT is 15× slower than CROSS-JEM in 99th percentile latency of 48CPU cores.

The massive latency gains are because CROSS-JEM allows scoring multiple keywords for a query in one shot by passing their concatenated tokens through the model. On the other hand, monoBERT scores each query-keyword pair independently necessitating 1000 passes compared to CROSS-JEM's 10.

In addition, CROSS-JEM provides 1.6× lower latency on GPUs than the production sparse model MEB on CPUs. This highlights CROSS-JEM's ability to leverage GPU acceleration for efficiency, unlike sparse models like MEB.

Throughput Comparison: Throughput refers to the number of query-keyword pairs that can be scored per second. Ranker models like CROSS-JEM not only need to support low latency but also high throughput needed to calculate relevance scores for query-keyword pairs to either create training data for retrieval models or create query-keyword associations to be included in lookup tables for popular queries. Note that the lookup tables need to be refreshed periodically to tackle query and keyword distribution shifts, hence making throughput gains even more important. From Table 7 in FIG. 12, it can be seen that CROSS-JEM achieves a throughput of 17,200 query-keyword pairs per second on a GPU. This is over 5× more than the 3,350 pairs per second for monoBERT.

The massive throughput and latency gains demonstrate the CROSS-JEM embodiment's ability to meet the computational demands of large-scale industrial systems. The joint scoring approach provides remarkable efficiency improvements without sacrificing accuracy.

5.3 RQ2: Accuracy Comparison

CROSS-JEM for ranking: First, the CROSS-JEM embodiment's accuracy for ranking keywords by relevance was evaluated. From Table 4 in FIG. 9, it can be observed that CROSS-JEM achieves a MAP@100 of 97.48 which is only 0.94% lower than the standard cross encoder baseline. The AUC@50 is also comparable. Further, CROSS-JEM improves over the sparse MEB model's MAP by over 13%.

This shows the CROSS-JEM embodiment retains the effectiveness of cross encoders for ranking while improving computational efficiency. The minor accuracy loss is acceptable given the order-of-magnitude latency gains.

CROSS-JEM for quality control: Next, the CROSS-JEM embodiment's ability to eliminate irrelevant keywords while preserving relevant ones is assessed. Table 5 in FIG. 10 shows the negative accuracy and overall accuracy when retaining top 80% of positive keywords per query.

The CROSS-JEM embodiment achieves 99.45% negative accuracy, removing nearly all irrelevant keywords. The overall accuracy is 95.27%, comparable to the cross encoder baseline. Further, the CROSS-JEM embodiment provides massive gains over MEB in both metrics. This demonstrates. The CROSS-JEM embodiment's efficacy for filtering out low-quality keywords, crucial in industrial systems. The high negative accuracy also confirms that the CROSS-JEM embodiment retains the ability of cross attention encoder 31 to discern between relevant and irrelevant keyword-query pairs accurately.

5.4 RQ3: Ablations

Experiments were conducted to understand the benefits of different design choices in the CROSS-JEM embodiment.

Varying Number of keywords scored per Query: From Table 8 in FIG. 13, the number of keywords scored per query from 10 to 100 was varied. With more keywords, the token overlap increases, providing the CROSS-JEM embodiment more opportunity for joint modeling. Correspondingly, gains were observed in negative accuracy and AUC as keywords per query increase.

Ablation on transformer in the CROSS-JEM embodiment: Next, the 6-layer DistilBERT encoder in the CROSS-JEM embodiment was replaced with a smaller 2 layer TinyBERT encoder. From Table 9, it can be observed that while the simpler encoder reduces latency by 6× to 114 ms on CPU (48 threads), this makes it very close to the MEB baseline's latency. However, TinyBERT still retains much higher accuracy than MEB with 96.52% negative accuracy and 92.76% overall accuracy compared to MEB's 84.59% and 84.40% respectively. This shows that even with a smaller encoder, the CROSS-JEM embodiment provides significant accuracy gains over sparse models like MEB while having comparable latency.

6 CONCLUSION

The above described computing systems and methods provide an efficient cross attention encoder based approach for scoring multiple query-keyword pairs in a single pass in real-time. The disclosed cross attention encoder effectively handles a key challenge in large-scale industrial systems, namely, scoring a large number (e.g., thousands) of keywords jointly per query within strict latency budgets. Comprehensive evaluations on data from a commercial search engine and established public benchmarks highlight the technical advantages of the disclosed cross attention encoder in striking a balance between relevance and computational constraints, and achieving both accuracy and latency sufficient to be useful in commercial deployments.

A few potential extensions to enhance systems and methods described above are outlined below. First, it is possible to use a weighted union of keyword tokens instead of a simple union to selectively emphasize important tokens. The weights can be learned or set based on corpus statistics. Second, more particular attention schemes such as having the query tokens attend over the union of keyword tokens, and keyword tokens just attend over the query and their own relevant subset, can be adopted. Third, biases can be introduced in token attention based on co-occurrence statistics mined from data. For instance, a token could attend primarily to frequently co-occurring tokens. Fourth, the vocabulary of the encoder could be expanded to incorporate rare or unseen tokens, which could allow the model to learn and exploit higher order interactions between keywords. Fifth, ranking losses such as mean reciprocal rank could be incorporated into the cross attention encoder training to directly improve ranking metrics.

Figure 15:
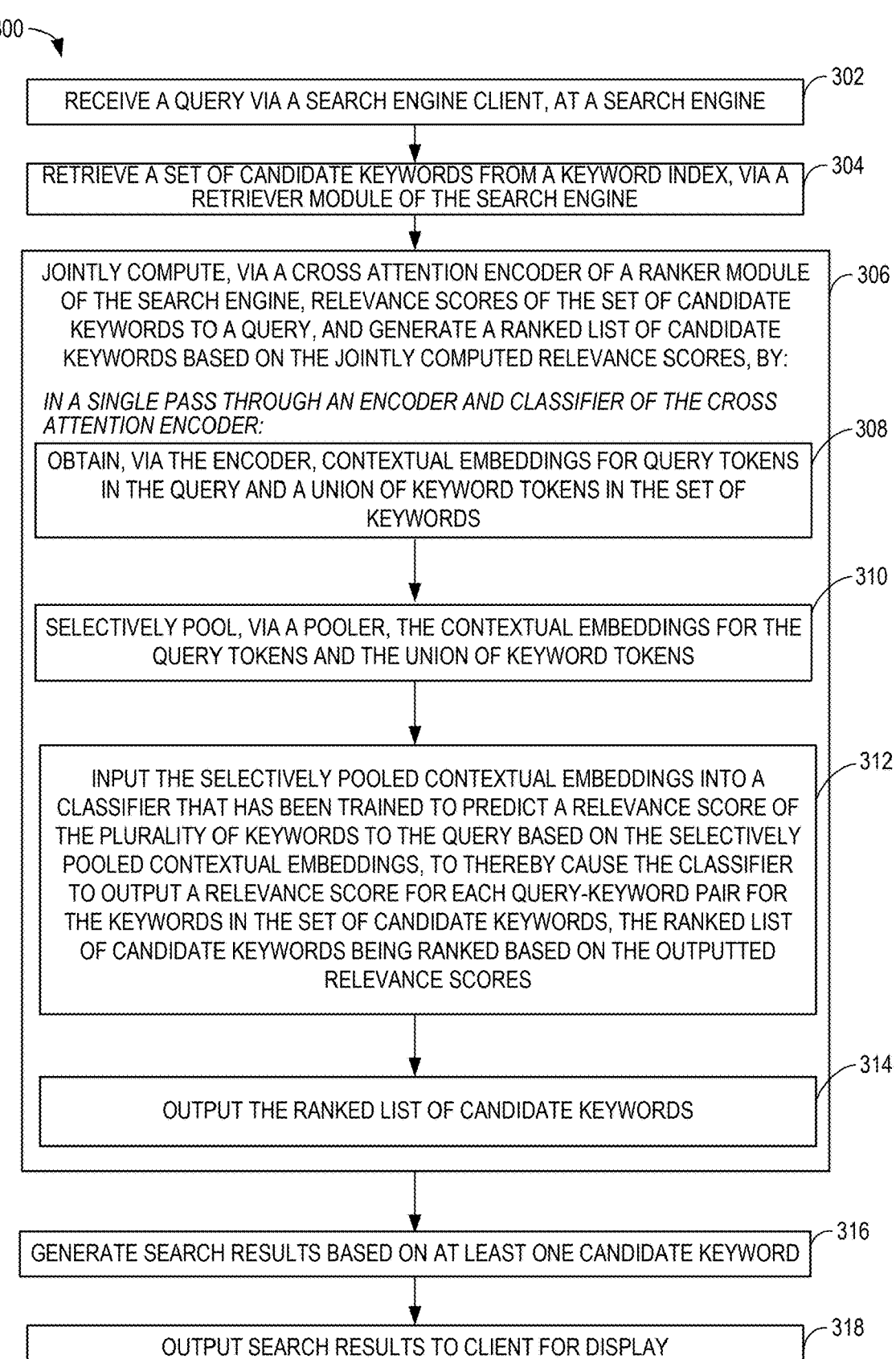
FIG. 15 shows a flowchart of a computerized method according to one example implementation of the present disclosure.

FIG. 15 shows a flowchart of a computerized method 300 according to one example implementation present disclosure. Method 300 may be implemented using the hardware and software components illustrated in FIGS. 1 and 2B, or other suitable software and hardware components. At step 302, the method may include receiving a query from a user of a client such as a search engine client executed on a client computing device, at a server such as a search engine server, via a computer network such as the Internet. At step 304, the method may include retrieving, via a retriever module of the search engine, a set of candidate keywords from a keyword index of the search engine. At step 306, the method may include jointly computing, via a ranker module of the search engine, relevance scores of the set of candidate keywords to a query, and generating a ranked list of candidate keywords based on the jointly computed relevance scores by the following steps 308, 310, 312, and 314. Step 306 is typically accomplished by a cross attention encoder of the ranker module of the search engine.

At step 308, to compute the relevance scores, the method may include obtaining, via an encoder, contextual embeddings for query tokens in the query and a union of keyword tokens in the set of keywords. At step 310, to compute the relevance scores, the method may further include selectively pooling, via a pooler, the contextual embeddings for the query tokens and the union of keyword tokens. At step 312, to compute the relevance scores, the method may further include inputting the selectively pooled contextual embeddings into a classifier that has been trained to predict a relevance score of the plurality of keywords to the query based on the selectively pooled contextual embeddings, to thereby cause the classifier to output a relevance score for each query-keyword pair for the keywords in the set of candidate keywords. The ranked list of candidate keywords is typically ranked based on the outputted relevance scores. At step 314, the method may further include outputting the ranked list of candidate keywords, ranked by the relevance scores. Typically this ranked list of candidate keywords is output to a search result module. At step 316, the method may further include generating, via the search result module, search results based on at least one of the candidate keywords in the ranked list of candidate keywords, for example in the manner described above. At step 318, the method may include outputting the search results to the search engine client for display.

In some embodiments, the methods and processes described herein may be tied to a computing system of one or more computing devices. In particular, such methods and processes may be implemented as a computer-application program or service, an application-programming interface (API), a library, and/or other computer-program products.

Figure 16:
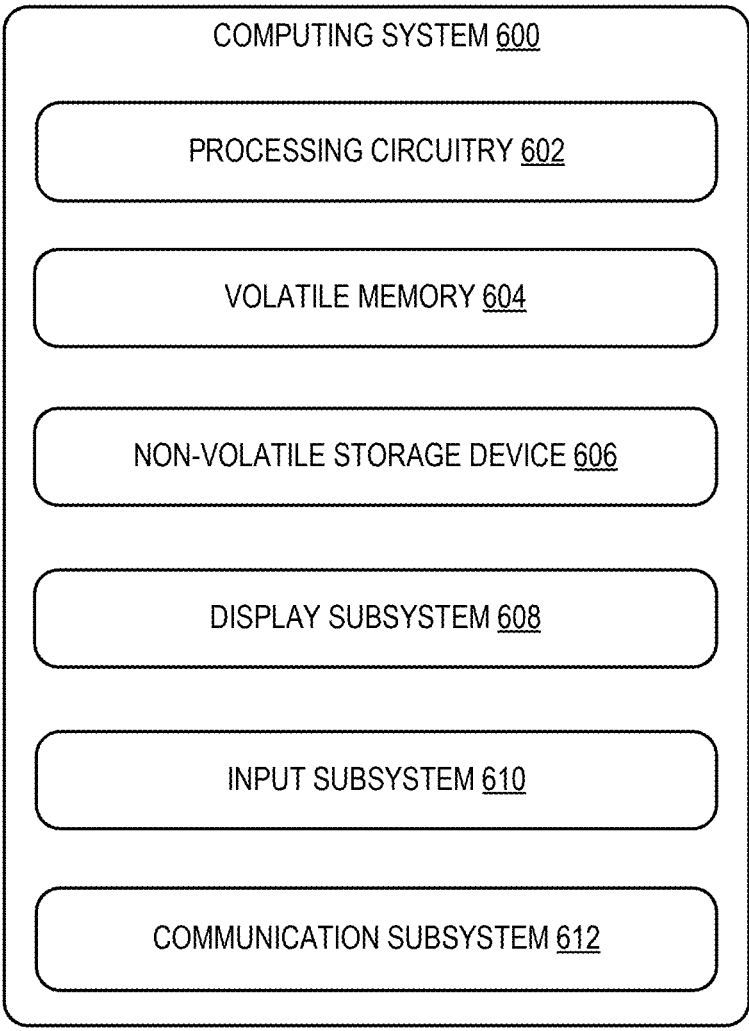
FIG. 16 shows a schematic view of an example computing environment that may be used to implement the computing system of FIGS. 1 and 2B.

FIG. 16 schematically shows a non-limiting embodiment of a computing system 600 that can enact one or more of the methods and processes described above. Computing system 600 is shown in simplified form. Computing system 600 may embody the computing system 10 described above and illustrated in FIG. 1 and FIG. 2B. Components of computing system 600 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 2B.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, camera, or microphone.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 600 to send and/or receive messages to and/or from other devices via a network such as the Internet.

The following paragraphs provide additional description of the subject matter of the present disclosure. One aspect provides a computing system including processing circuitry and associated memory. According to this aspect, the processing circuitry may be configured to execute instructions stored in the associated memory to implement a ranker module configured to jointly compute relevance scores of a set of candidate keywords to a query, and to generate a ranked list of candidate keywords based on the jointly computed relevance scores. The ranker module may include a cross attention encoder configured to jointly compute the relevance scores by obtaining, via an encoder, contextual embeddings for query tokens in the query and a union of keyword tokens in the set of keywords, selectively pooling the contextual embeddings for the query tokens and the union of keyword tokens, inputting the selectively pooled contextual embeddings into a classifier that has been trained to predict a relevance score of the keywords to the query based on the selectively pooled contextual embeddings, to thereby cause the classifier to output a relevance score for each query-keyword pair for the keywords in the set of candidate keywords, wherein the ranked list of candidate keywords is ranked based on the outputted relevance scores, and outputting the ranked list of candidate keywords.

According to this aspect, the selectively pooled contextual embeddings may be input in a single pass through the classifier to output the relevance scores for the keyword-query pairs for all candidate keywords.

According to this aspect, the processing circuitry may be further configured to implement a retriever module configured to receive the query and generate the set of candidate keywords based on the query, from a keyword set that is larger than the candidate keyword set.

According to this aspect, the ranker module may be a component in a search engine, and the query is a search query received from a user via a user interface of the search engine.

According to this aspect, to jointly compute the relevance scores, the cross attention encoder has been trained based on a training data set including a plurality of training keyword-query pairs and associated ground truth teacher model relevance scores computed by a teacher model, in which the computation of the ground truth teacher model relevance scores by the teacher model may be more computationally expensive than the computation of the relevance scores by the cross attention encoder.

According to this aspect, selectively pooling the contextual embeddings may be accomplished using a maximum pooling operation or mean pooling operation.

According to this aspect, selectively pooling the contextual embeddings may produce a single embedding for each keyword-query input pair for all candidate keywords, and the single embeddings for the keyword-query pairs for all candidate keywords may be combined and input into the classifier in a single pass.

According to this aspect, selectively pooling the contextual embeddings may be achieved using a keyword union attention mask.

According to this aspect, the keyword union attention mask may include each keyword token only once.

According to another aspect of the present disclosure, a computerized method is provided. According to this aspect, the method may include jointly computing, via a cross attention encoder, relevance scores of a set of candidate keywords to a query, and to generate a ranked list of candidate keywords based on the jointly computed relevance scores. The relevance scores may be computed by obtaining contextual embeddings for query tokens in the query and a union of keyword tokens in the set of keywords, selectively pooling the contextual embeddings for the query tokens and the union of keyword tokens, inputting the selectively pooled contextual embeddings into a classifier that has been trained to predict a relevance score of the plurality of keywords to the query based on the selectively pooled contextual embeddings, to thereby cause the classifier to output a relevance score for each query-keyword pair for the keywords in the set of candidate keywords, wherein the ranked list of candidate keywords is ranked based on the outputted relevance scores, and outputting the ranked list of candidate keywords.

According to this aspect, the selectively pooled contextual embeddings may be input in a single pass through the classifier to output the relevance scores for the query-keyword pairs for all candidate keywords.

According to this aspect, the method may further include receiving the query and generating the set of candidate keywords based on the query, from a keyword set that is larger than the candidate keyword set.

According to this aspect, the ranker module may be a component in a search engine, and the query is a search query received from a user via a user interface of the search engine.

According to this aspect, to jointly compute the relevance scores, the cross attention encoder has been trained based on a training data set including a plurality of training keyword-query pairs and associated ground truth teacher model relevance scores computed by a teacher model, in which the computation of the ground truth teacher model relevance scores by the teacher model may be more computationally expensive than the computation of the relevance scores by the cross attention encoder According to this aspect, selectively pooling the contextual embeddings may be accomplished using a maximum pooling operation or mean pooling operation According to this aspect, selectively pooling the contextual embeddings may produce a single embedding for each keyword-query input pair for all candidate keywords, and the single embeddings for the keyword-query pairs for all candidate keywords are combined and input into the classifier in a single pass.

According to this aspect, selectively pooling the contextual embeddings may be achieved using a keyword union attention mask.

According to this aspect, the keyword union attention mask may include each keyword token appears only once.

According to another aspect of the present disclosure, a computing system is provided. According to this aspect, the computing system may include a server including processing circuitry and associated memory. The processing circuitry may be configured to execute instructions stored in the associated memory to implement a search engine. The search engine may be configured to receive a search query from a user via a graphical user interface of a search engine client communicating with the search engine. The search engine may include a retriever module configured to receive the search query and generate a set of candidate keywords based on the search query, from a keyword set that is larger than the candidate keyword set. The search engine may further include a ranker module configured to jointly compute relevance scores of a set of candidate keywords to the search query, and to generate a ranked list of candidate keywords based on the jointly computed relevance scores. The ranker module may include a cross attention encoder configured to jointly compute the relevance scores by obtaining, via an encoder, contextual embeddings for query tokens in the search query and a union of keyword tokens in the set of keywords, selectively pooling the contextual embeddings for the query tokens and the union of keyword tokens, inputting the selectively pooled contextual embeddings into a classifier that has been trained to predict a relevance score of the plurality of keywords to the search query based on the selectively pooled contextual embeddings, to thereby cause the classifier to output a relevance score for each query-keyword pair for the keywords in the set of candidate keywords, wherein the ranked list of candidate keywords is ranked based on the outputted relevance scores, and outputting the ranked list of candidate keywords. The computing system may further include a search result module configured to generate a search result including content associated with at least one of the candidate keywords in the list, and output the search result to the search engine client for display in the graphical user interface.

According to this aspect, selectively pooling the contextual embeddings may use a keyword union attention mask in which each keyword token appears only once, and may produce a single embedding for each query-keyword input pair for all candidate keywords. The single embeddings of the selectively pooled contextual embeddings may be combined and input in a single pass through the classifier to output the relevance scores for the query-keyword pairs for all candidate keywords.

"And/or" as used herein is defined as the inclusive or V, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:

processing circuitry and associated memory, the processing circuitry being configured to execute instructions stored in the associated memory to implement:

a search engine configured to receive a search query from a search engine client communicating with the search engine;

a retriever module configured to generate a set of candidate keywords based on the search query;

a ranker module configured to jointly compute relevance scores of the set of candidate keywords to the search query, and to generate a ranked list of candidate keywords based on the jointly computed relevance scores, wherein the ranker module includes a cross attention encoder configured to jointly compute the relevance scores by:

obtaining, via an encoder, contextual embeddings for query tokens in the search query and a union of keyword tokens in the set of keywords;

selectively pooling the contextual embeddings for the query tokens and the union of keyword tokens;

inputting the selectively pooled contextual embeddings into a classifier that has been trained to predict a relevance score of the keywords to the search query based on the selectively pooled contextual embeddings, to thereby cause the classifier to output a relevance score for each of query-keyword pairs for the keywords in the set of candidate keywords, wherein the ranked list of candidate keywords is ranked based on the outputted relevance scores; and outputting the ranked list of candidate keywords; and a search result module configured to generate a search result including content associated with at least one of the candidate keywords in the ranked list, and output the search result to the search engine client, wherein the selectively pooled contextual embeddings are input through the classifier to output the relevance scores for the query-keyword pairs for all candidate keywords in a single pass, thereby enabling real-time scoring of multiple query-keyword pairs.

2. The computing system of claim 1, wherein, to jointly compute the relevance scores, the cross attention encoder has been trained based on a training data set including a plurality of training keyword-query pairs and associated ground truth teacher model relevance scores computed by a teacher model, the computation of the ground truth teacher model relevance scores by the teacher model being more computationally expensive than the computation of the relevance scores by the cross attention encoder.

3. The computing system of claim 1, wherein selectively pooling the contextual embeddings is accomplished using a maximum pooling operation or mean pooling operation.

4. The computing system of claim 1, wherein selectively pooling the contextual embeddings produces a single embedding for each keyword-query input pair for all candidate keywords, and the single embeddings for the keyword-query pairs for all candidate keywords are combined and input into the classifier in the single pass.

5. The computing system of claim 1, wherein selectively pooling the contextual embeddings is achieved using a keyword union attention mask.

6. The computing system of claim 5, wherein the keyword union attention mask includes each keyword token only once.

7. A computerized method, comprising:

receiving, via a search engine, a search query from a search engine client communicating with the search engine;

generating a set of candidate keywords based on the search query;

jointly computing, via a cross attention encoder, relevance scores of the set of candidate keywords to the search query, and to generate a ranked list of candidate keywords based on the jointly computed relevance scores, wherein the relevance scores are computed by:

obtaining contextual embeddings for query tokens in the search query and a union of keyword tokens in the set of keywords;

selectively pooling the contextual embeddings for the query tokens and the union of keyword tokens;

inputting the selectively pooled contextual embeddings into a classifier that has been trained to predict a relevance score of the plurality of keywords to the search query based on the selectively pooled contextual embeddings, to thereby cause the classifier to output a relevance score for each of query-keyword pairs for the keywords in the set of candidate keywords, wherein the ranked list of candidate keywords is ranked based on the outputted relevance scores; and outputting the ranked list of candidate keywords; and generating a search result including content associated with at least one of the candidate keywords in the ranked list, and output the search result to the search engine client, wherein the selectively pooled contextual embeddings are input through the classifier to output the relevance scores for the query-keyword pairs for all candidate keywords in a single pass, thereby enabling real-time scoring of multiple query-keyword pairs.

8. The computerized method of claim 7, wherein, to jointly compute the relevance scores, the cross attention encoder has been trained based on a training data set including a plurality of training keyword-query pairs and associated ground truth teacher model relevance scores computed by a teacher model, the computation of the ground truth teacher model relevance scores by the teacher model being more computationally expensive than the computation of the relevance scores by the cross attention encoder.

9. The computerized method of claim 7, wherein selectively pooling the contextual embeddings is accomplished using a maximum pooling operation or mean pooling operation.

10. The computerized method of claim 7, wherein selectively pooling the contextual embeddings produces a single embedding for each keyword-query input pair for all candidate keywords, and the single embeddings for the keyword-query pairs for all candidate keywords are combined and input into the classifier in the single pass.

11. The computerized method of claim 7, wherein selectively pooling the contextual embeddings is achieved using a keyword union attention mask.

12. The computerized method of claim 11, wherein the keyword union attention mask includes each keyword token appears only once.

13. A computing system, comprising:

a server including processing circuitry and associated memory, the processing circuitry being configured to execute instructions stored in the associated memory to implement:

a search engine, the search engine being configured to receive a search query from a user via a graphical user interface of a search engine client communicating with the search engine, wherein the search engine includes:

a retriever module configured to receive the search query and generate a set of candidate keywords based on the search query, from a keyword set that is larger than the candidate keyword set; and a ranker module configured to jointly compute relevance scores of a set of candidate keywords to the search query, and to generate a ranked list of candidate keywords based on the jointly computed relevance scores, wherein the ranker module includes a cross attention encoder configured to jointly compute the relevance scores by:

obtaining, via an encoder, contextual embeddings for query tokens in the search query and a union of keyword tokens in the set of keywords;

selectively pooling the contextual embeddings for the query tokens and the union of keyword tokens;

inputting the selectively pooled contextual embeddings into a classifier that has been trained to predict a relevance score of the plurality of keywords to the search query based on the selectively pooled contextual embeddings, to thereby cause the classifier to output a relevance score for each of query-keyword pairs for the keywords in the set of candidate keywords, wherein the ranked list of candidate keywords is ranked based on the outputted relevance scores; and outputting the ranked list of candidate keywords; and a search result module configured to generate a search result including content associated with at least one of the candidate keywords in the list, and output the search result to the search engine client for display in the graphical user interface, wherein selectively pooling the contextual embeddings uses a keyword union attention mask in which each keyword token appears only once, and produces a single embedding for each of the query-keyword pairs for all candidate keywords, and the single embeddings of the selectively pooled contextual embeddings are combined and input in a single pass through the classifier to output the relevance scores for the query-keyword pairs for all candidate keywords, thereby enabling real-time scoring of multiple query-keyword pairs.

* * * * *